United States Patent [19]
Oda

[11] Patent Number: 5,254,917
[45] Date of Patent: Oct. 19, 1993

[54] DIRECT CURRENT MOTOR DRIVING DEVICE

[76] Inventor: Nobuo Oda, 26-10, Noge 2-chome, Setagaya-ku, Tokyo 158, Japan

[21] Appl. No.: 872,222

[22] Filed: Apr. 22, 1992

[51] Int. Cl.$^5$ .............................................. G05B 5/00
[52] U.S. Cl. .................................. 318/466; 318/446; 318/459; 318/479
[58] Field of Search ............... 318/139, 446, 449, 450, 318/459, 466, 469, 474–477, 478–479, 280, 286, 283; 446/431, 448–449, 465

[56] References Cited

U.S. PATENT DOCUMENTS

| | | | |
|---|---|---|---|
| 3,728,604 | 4/1973 | Grygera | 318/459 |
| 4,085,356 | 4/1978 | Meinema | 318/270 |
| 4,396,876 | 8/1983 | Tojika et al. | 318/255 |

*Primary Examiner*—William M. Shoop, Jr.
*Assistant Examiner*—D. Martin
*Attorney, Agent, or Firm*—Dickstein, Shapiro & Morin

[57] ABSTRACT

A direct current motor driving device for driving a direct current motor having a plus terminal and a minus terminal, which comprises a direct current source having a plus terminal and a minus terminal, the plus terminal being connected to the plus terminal of the direct current motor, pulse generating device for generating a pulse signal when an input signal to an input terminal of the pulse generating device exceeds a set threshold value, driving device for driving the direct current motor in response to the pulse signal outputted by the pulse generating means, and a first resistance type voltage dividing circuit inserted between the minus terminal of the direct current source and a minus terminal of the direct current motor for providing as the input signal to the pulse generating device a voltage signal produced by resistance-dividing a voltage between these terminals in a first ratio, whereby a counter electromotive force generated by the direct current motor by the rotation of the direct current motor by an external force in a direction opposite to its driving rotational direction is added to a source voltage of the direct current source to be supplied to the first resistance type voltage dividing circuit, the voltage signal of the first resistance type voltage dividing circuit is increased to exceed the set threshold value of the pulse generating device, and the pulse signal is generated by the pulse generating device to actuate the direct current motor. The direct current motor driving device enables direct current motors for general-purposes to be actuated and stopped without the use of power switches.

15 Claims, 6 Drawing Sheets

DIRECT CURRENT MOTOR DRIVING DEVICE

BACKGROUND OF THE INVENTION

The present invention relates to a direct current motor driving device, specifically a direct current motor driving device for driving a small-sized direct current motor to be built in toys and so on.

Conventionally small-sized direct current motors having cells as the electric sources have been dominantly used in toys, such as cars. Usually toys having direct current motors built in have power switches between the sources and the direct current motors for turning on and off the direct current motors. When the toys are used, the power switches are turned on to supply electric power to the direct current motors, and when the toys are stopped, the power switches are turned off to stop the supply of the electric power to the direct current motors.

As the conventional direct current motors which can be actuated and stopped without the use of power switches are known double-pole direct current motors having a special structure having a wider gap between the commutator segments of the commutators for non conductive point with conductive brushes. The double-pole direct current motor of this type makes use of the fact that with a gap between the commutator segments made wider, when the motor is rotated at high speed, the rotation is retained due to an inertia, but when the motor is rotated at low speed, the commutator segments come out of contact with the conductive brushes, and the motor is stopped. When this direct current motor is actuated, the motor is rotated at high speed by an external force and is set on the rotation. When the motor is stopped, a large load is applied to the motor, and the motor is stopped.

But this switchless direct current motor has the problem that because this motor can not be actuated unless rotated at high speed, its actuation is difficult. Another problem is that because this motor has the special structure that the gap between the segments of the commutator is wider, the output torque is small, and the current consumption is large with the result of low driving efficiency.

SUMMARY OF THE INVENTION

An object of the present invention is to provide a direct current motor driving device which enables direct current motors for general-purposes to be actuated and stopped without the necessity of the conventional special motor structure and without the use of power switches.

Another object of the present invention is to provide mobile toys having direct current motors for general-purposes which can be actuated and stopped by operating the mobile toys by external forces and without the use of power switches.

The above-described objects can be achieved by a direct current motor driving device for driving a direct current motor having a plus terminal and a minus terminal, the device comprising: a direct current source having a plus terminal and a minus terminal, the plus terminal being connected to the plus terminal of the direct current motor; pulse generating means for generating a pulse signal when an input signal to an input terminal of the pulse generating means exceeds a set threshold value; driving means for driving the direct current motor in response to the pulse signal outputted by the pulse generating means; and a first resistance type voltage dividing circuit inserted between the minus terminal of the direct current source and a minus terminal of the direct current motor for providing as the input signal to the pulse generating means a voltage signal produced by resistance-dividing a voltage between these terminals in a first ratio, whereby a counter electromotive force generated by the direct current motor by the rotation of the direct current motor by an external force in a direction opposite to its driving rotational direction is added to a source voltage of the direct current source to be supplied to the first resistance type voltage dividing means, the voltage signal of the first resistance type voltage dividing means is increased to exceed the set threshold value of the pulse generating means, and the pulse signal is generated by the pulse generating means to actuate the direct current motor.

The above-described objects can be achieved by a mobile toy comprising: a mobile toy body; running wheels for running the mobile toy body in a required direction; a direct current motor having a plus terminal and a minus terminal for rotating the running wheels; and a direct current motor driving device including a direct current source having a plus terminal and a minus terminal, the plus terminal being connected to the plus terminal of the direct current motor; pulse generating means for generating a pulse signal when an input signal to an input terminal thereof exceeds a set threshold value; driving means for driving the direct current motor in response to the pulse signal from the pulse generating means; and a first resistance type voltage dividing circuit inserted between the minus terminal of the direct current source and the minus terminal of the direct current motor for providing as the input signal to the pulse generating means a voltage signal produced by resistance-dividing a voltage between these terminals in a first ratio, whereby a counter electromotive force generated by the direct current motor by running the mobile toy body in a direction opposite to its running direction by an external force is added to a source voltage to be supplied to the first resistance type voltage dividing circuit, the voltage signal of the first resistance type voltage dividing circuit is increased to exceed the set threshold value of the pulse generating means, and the pulse signal is generated by the pulse generating means to actuate the direct current motor and rotate the running wheels, and the mobile toy body runs in a running direction.

BRIEF DESCRIPTION OF THE DRAWINGS

FIG. 5 is an appearance view of a toy car the direct current motor driving device according to the present invention is applied to.

DETAILED DESCRIPTION OF THE INVENTION

Figure 1:
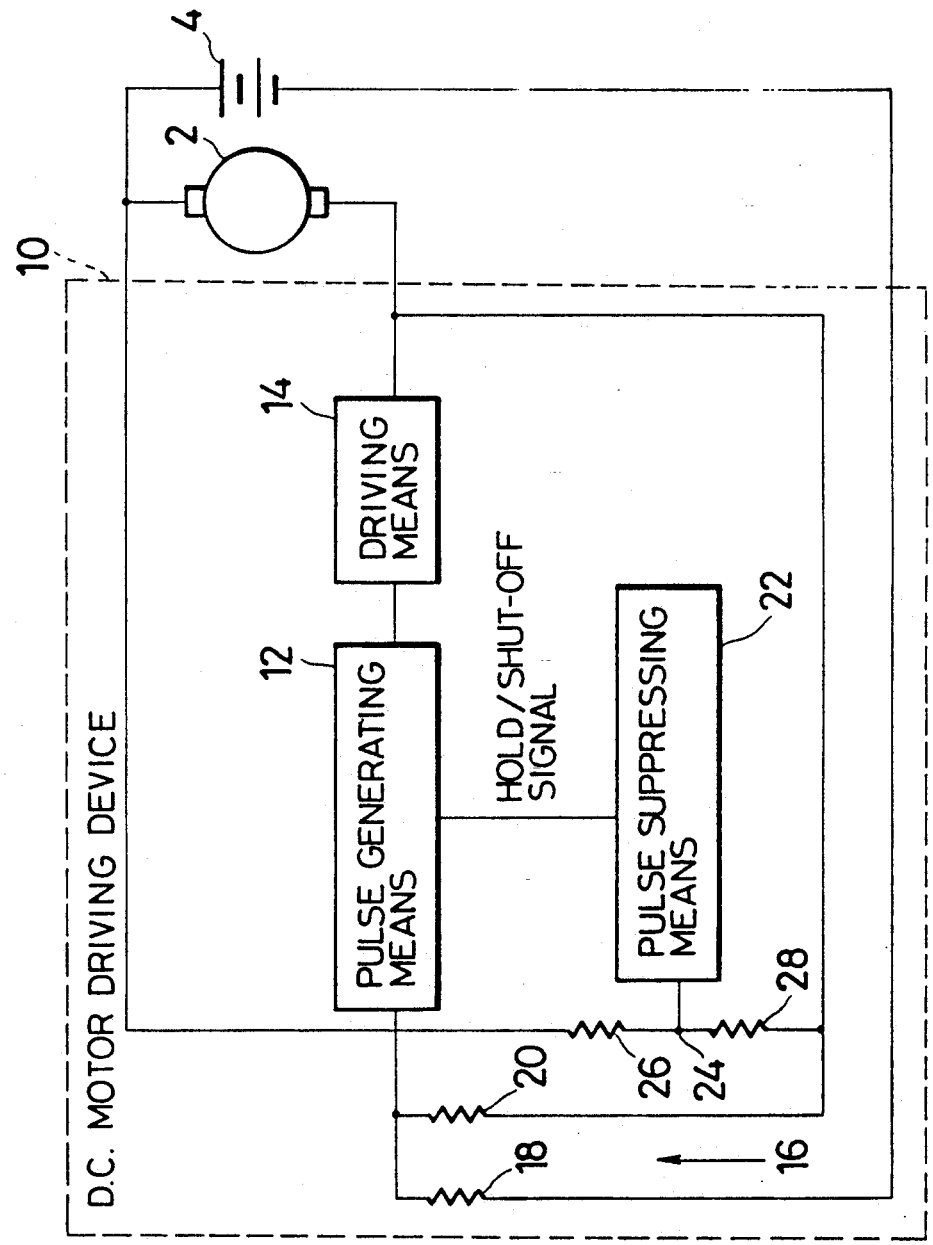
FIG. 1 is a block diagram of the direct current motor driving device according to a first embodiment of the present invention.
Figure 2:
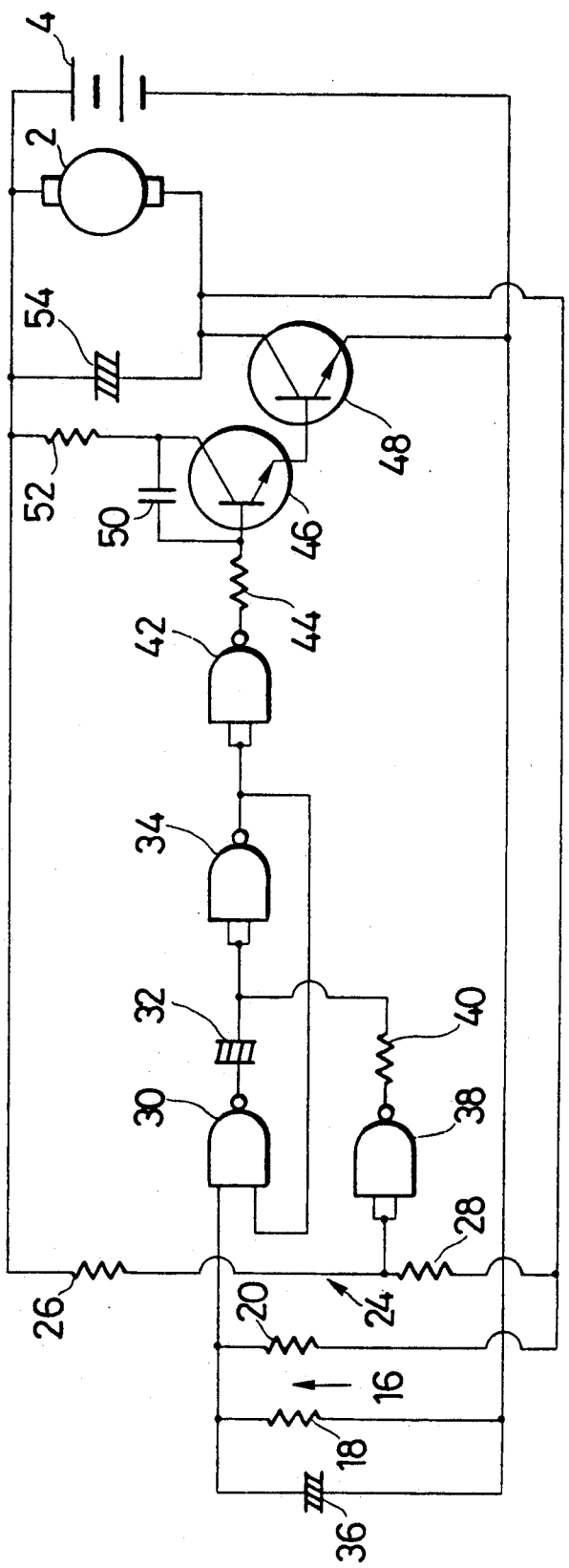
FIG. 2 is a circuit diagram of the direct current motor driving device according to the first embodiment of the present invention.

The direct current motor driving device according to a first embodiment of the present invention will be explained with reference to FIGS. 1 and 2. FIG. 1 is a block diagram of the direct current motor driving device, and FIG. 2 is a circuit diagram of the direct current motor driving device of FIG. 1.

In this embodiment, a three-pole direct current motor 2 for universal purposes will be driven. A direct current source 4 is provided to supply a power to the direct current motor 2. The plus terminal of the direct current motor 2 is connected to the plus terminal of the direct current source 4. A direct current motor driving device 10 is provided to drive the direct current motor 2.

The direct current motor driving device 10 comprises pulse generating means 12 for generating a pulse signal when an input signal exceeds a set threshold value, and driving means 14 for driving the direct current motor 2 in response to the pulse signal from the pulse generating means 12.

The direct current motor driving device 10 includes a resistance type voltage dividing circuit 16 inserted between the minus terminal of the direct current source 4 and the minus terminal of the direct current motor 2. The resistance type voltage dividing circuit 16 outputs a voltage signal produced by resistance-dividing a voltage between both terminals in a set ratio. The resistance type voltage dividing circuit 16 includes a resistor 18 inserted between the minus terminal of the direct current source 4 and an input terminal of the pulse generating means 12, and a resistor 20 inserted between the input terminal of the pulse generating means 12 and the minus terminal of the direct current motor 2. The values of the resistors 18, 20 are so set that the voltage signal produced by resistance-dividing a voltage by the resistance type voltage dividing circuit 16 is slightly below the threshold value of the input signal of the pulse generating means 12 with the direct current motor 2 stopped rotating.

The pulse generating means 12 includes pulse suppressing means 22 for suppressing the generation of the pulse signal by the pulse generating means 12 when an input signal to an input terminal exceeds a threshold value of the pulse suppressing means 22.

A resistance type voltage dividing circuit 24 is inserted between the plus terminal of the direct current source 4 and the minus terminal of the direct current motor 2. The resistance type voltage dividing circuit 24 outputs a voltage signal produced by resistance-dividing a voltage between both terminals in a set ratio the resistance type voltage dividing circuit 24 comprises a resistor 26 inserted between the plus terminal of the direct current source 4 and the input terminal of the pulse suppressing means 22, and a resistor 28 inserted between the input terminal of the pulse suppressing means 22 and the minus terminal of the direct current motor 2. The values of the resistors 26, 28 are set so as to be lower than the threshold value of the pulse suppressing means 22 with the direct current motor 2 driven, and to be higher than the threshold value of the pulse suppressing means 22 with the direct current motor 2 stopped rotating.

Next, the operation of the direct current motor driving device according to this embodiment will be explained.

In this embodiment the direct current motor 2 is forcedly rotated in a direction opposite to its driving rotational direction so as to be actuated, and is forcedly stopped so as to be stopped driving.

It is general that when the direct current motor 2 is rotated by an external force, a counter electromotive force is generated by the direct current motor 2. In this embodiment, the direct current motor 2 is actuated by using a counter electromotive force generated when the direct current motor 2 is rotated in a direction opposite to its driving rotational direction. When the direct current motor 2 is rotated by an external force in a direction opposite to its driving rotational direction, a counter electromotive force is added to a source voltage of the direct current source 4 to be supplied to the resistance type voltage dividing circuit 16. Then the voltage signal of the resistance type dividing circuit 16 is increased to exceed the threshold value of the pulse generating means 12. Then when the direct current motor 2 is stopped rotating, the voltage signal of the resistance type voltage dividing circuit 16 is decreased back below the threshold value, and the pulse generating means 12 is triggered to generate the pulse signal. In response to this pulse signal the driving means 14 actuates the direct current motor 2 in its driving rotational direction.

Since the voltage signal outputted from the resistance type voltage dividing circuit 24 with the direct current motor 2 driven is below the threshold value, the pulse suppressing means 22 outputs to the pulse generating means 12 a holding signal for retaining the pulse signal at a high level. Consequently the direct current motor 2 continues its rotation.

When the direct current motor 2 is stopped rotating by an external force, a load of the direct current motor 2 is increased, and thus the current consumption is increased. Consequently a voltage to be supplied to the resistance type voltage dividing circuit 24 is decreased, the voltage signal to the resistance type voltage dividing circuit 24 is increased to exceed the threshold value of the pulse suppressing means 22, and a pulse suppressing signal for suppressing the generation of the pulse signal of the pulse generating means 12 is generated. Consequently no pulse signal is outputted from the pulse generating means 12, and the direct current motor 2 is stopped.

An example of the circuit of the direct current motor driving device according to this embodiment will be explained with reference to FIG. 2.

The pulse generating means 12 is a one-shot multivibrator comprising a NAND gate 30, a condenser 32, and a NAND gate 34.

The NAND gate 30 has a first input terminal connected to the intermediate node of the resistance type voltage dividing circuit 16, and a second input terminal connected to the output terminal of the NAND gate 34, and an output terminal connected to the condenser 32. A threshold value of the NAND gate 30 is the threshold value of the pulse generating means 12. A first input terminal and a second input terminal of the NAND gate 34 is commonly connected to the condenser 32. The output terminal of the NAND gate 34 is connected to the second input terminal of the NAND gate 30.

The resistor 18 of the resistance type voltage divider 16 is connected in parallel to a condenser 36 for preventing the occurrence of noises.

The pulse suppressing means 22 comprises a NAND gate 38 and a resistor 40. A first input terminal of the NAND gate 38 and a second input terminal thereof are commonly connected to the intermediate node of the resistance type voltage dividing circuit 24. A resistor 40 is inserted between the output terminal of the NAND gate 38, and the intermediate node between the condenser 32 and the NAND gate 34. A threshold value of the NAND gate 38 is the threshold value of the pulse suppressing means 22.

A NAND gate 42 is connected as a buffer to the output terminal of the NAND gate 34 of the pulse generating means 12. A first input terminal of the NAND gate 34 and a second input terminal thereof are commonly connected to the output terminal of the NAND gate 34.

The driving means 14 comprises a resistor 44, an npn transistor 46, an npn transistor 48, a condenser 50 and a resistor 52. The resistor 44 is inserted between the output terminal of the NAND gate 42 and the base of the npn transistor 46. The npn transistor 46 and the npn transistor 48 are Darlington-connected. The condenser 50 is inserted between the base of the npn transistor 46 and the collector thereof. The resistor 52 is inserted between the collector of the npn transistor 46 and the plus terminal of the direct current source.

A condenser 54 is inserted between the plus terminal of the direct current motor 2 and the minus terminal thereof for preventing the occurrence of noises.

The operation of this exemplified circuit, shown in FIG. 2, of the direct current motor driving device will be explained.

With the direct current motor 2 stopped, since a voltage at the minus terminal of the direct current motor 2 is substantially equal to a source voltage of the direct current source 4, a voltage signal which is slightly lower than a threshold value of the NAND gate 30 of the pulse generating means 12. The resistance type voltage dividing circuit 24 outputs a voltage signal which is slightly higher than a threshold value of the NAND gate 38. Consequently an output signal of the NAND gate 30 is of high level, and an output signal of the NAND gate 38 is of low level.

When the direct current motor 2 is rotated in a direction opposite to its driving rotational direction, a counter electromotive force generated by the direct current motor 2 is added to a source voltage of the direct current source 4 to be supplied to the resistance type voltage dividing circuit 16. Then a voltage signal of the resistance type voltage dividing circuit 16 is increased to be of high level and exceeds the threshold value of the NAND gate 30. Subsequently the opposite rotation of the direct current motor 2 is stopped, the voltage signal from the resistance type voltage dividing circuit 16 becomes slightly lower than the threshold value of the NAND gate 30 of the pulse generating means 12, and is of low level.

Consequently the one-shot multivibrator comprising the NAND gate 30, the condenser 32 and the NAND gate 34 is triggered by a fall of the input signal, and generates the pulse signal. In response to this pulse signal, the driving means 14 actuates the direct current motor 2.

With the direct current motor 2 driven, since the voltage signal from the resistance type voltage dividing circuit 24 is lower than the threshold value, the output signal of the NAND gate 38 of the pulse suppressing means 22 becomes high level, and consequently the direct current motor 2 continues rotating.

When the direct current motor 2 is stopped rotating by an external force, a load of the direct current motor 2 is increased, and thus current consumption is increased. Consequently, a voltage to be supplied to the resistance type voltage dividing circuit 24 is decreased, the voltage signal of the resistance type voltage dividing circuit 24 is increased to exceed the threshold value of the NAND gate 22 of the pulse suppressing means 38, and the output signal of the NAND gate 38 becomes low level. Resultantly a charge accumulated in the condenser 32 is discharged, and no pulse signal is outputted from the pulse generating means 22, and the direct current motor 2 is stopped.

As described above, according to this embodiment, the direct current motor 2 can be actuated by forcedly rotating the same in a direction opposite to its driving direction, and can be stopped by forcedly stopping the same. Thus the direct current motor can be actuated and stopped without the use of a power switch.

Figure 3:
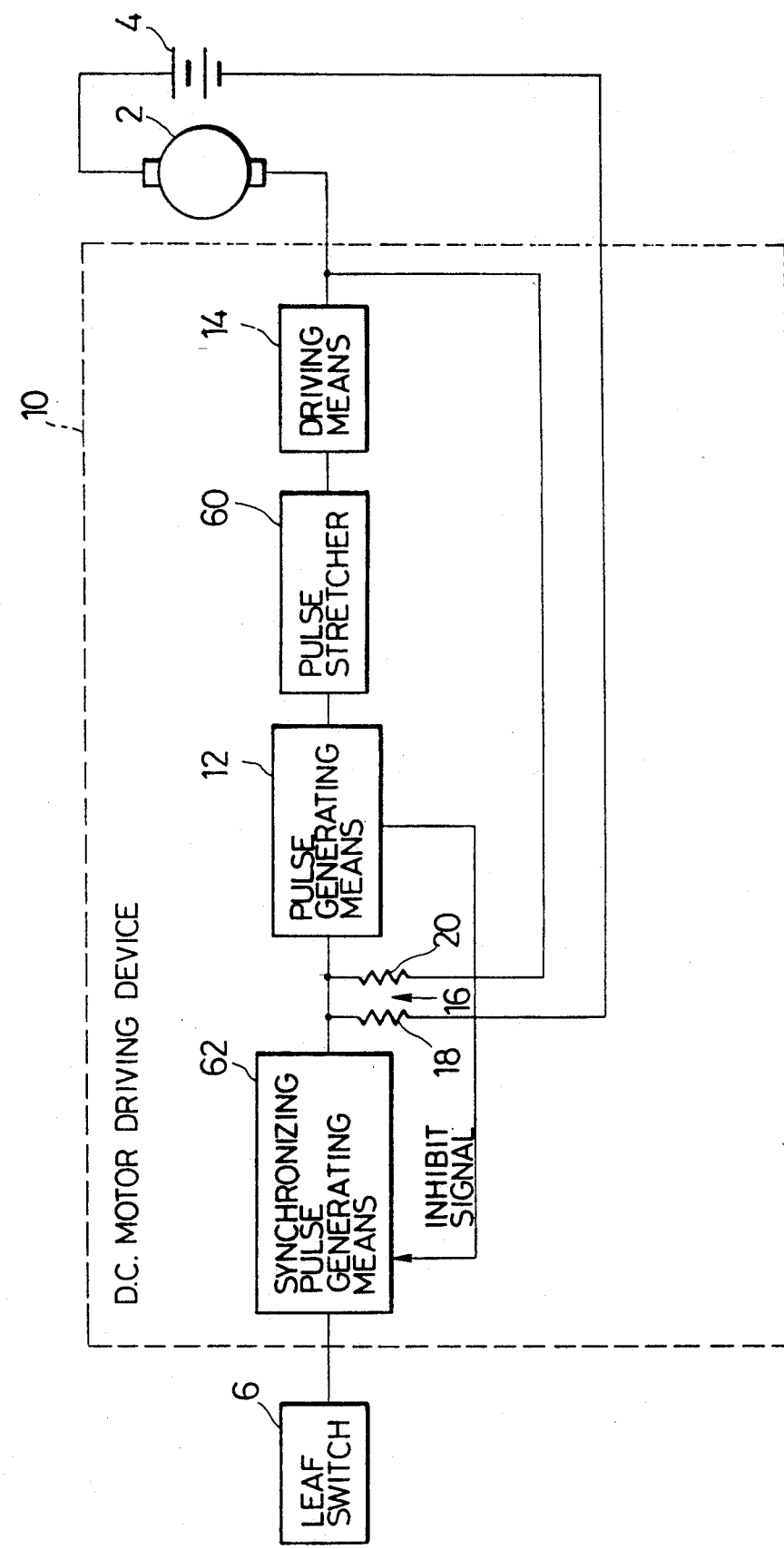
FIG. 3 is a block diagram of the direct current motor driving device according to a second embodiment of the present invention.
Figure 4:
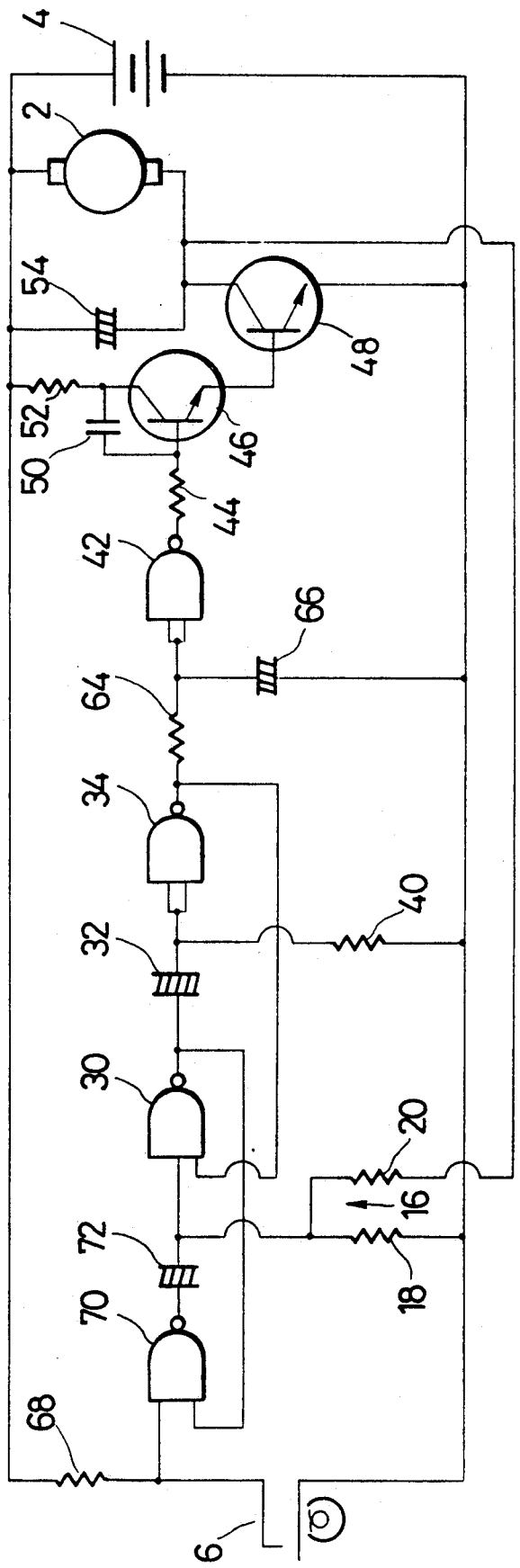
FIG. 4 is a circuit diagram of the direct current motor driving device according to the second embodiment of the present invention.

The direct current motor driving device according to a second embodiment of the present invention will be explained with reference to FIGS. 3 and 4. FIG. 3 is a block diagram of the direct current motor driving device according to the second embodiment. FIG. 4 is a circuit diagram of the direct current motor driving device. The members of the second embodiment which are common with the direct current motor driving device of FIGS. 1 and 2 are given common reference numbers to simplify and not to repeat their explanation.

In this embodiment, a three-pole direct current motor 2 is driven. A direct current motor 2 has a direct current source 4. The plus terminal of the direct current motor 2 is connected to the plus terminal of the direct current source 4. A direct current motor driving device 10 is provided to drive the direct current motor 2. There is provided a leaf switch 6 which turns on and off by the rotation of the rotary shaft of the direct current motor 2.

The direct current motor driving device 10 includes pulse generating means 12 which generates a pulse signal when an input signal exceeds a set threshold value, a pulse stretcher 60 which stretches a pulse signal outputted from the pulse generating means 12, and driving means 14 which drives the direct current motor 2 in response to the pulse signal from the pulse generating means 14.

A resistance type voltage dividing circuit 16 is inserted between the minus terminal of the direct current source 4 and the minus terminal of the direct current motor 2. The resistance type voltage dividing circuit 16 comprises a resistor 18 and a resistor 20. The values of the resistors 18, 20 are so set that a voltage signal produced by resistance-dividing a voltage by the resistance type voltage dividing circuit 16 is slightly below the threshold value of the input signal to the pulse generating means 12 with the direct current motor 2 stopped.

A synchronizing signal generating means 62 is provided before the pulse generating means 12. The synchronizing signal generating means 62 generates a pulse signal synchronized with ON/OFF of the leaf switch 6. A synchronizing pulse generated by the synchronizing pulse generating means 62 is outputted to the pulse generating means 12. An inhibit signal which suppresses the output of the synchronizing signal is being outputted from the pulse generating means 12 to the synchronizing pulse generating means 62.

Next, the operation of the direct current motor driving device according to this embodiment will be explained.

In this embodiment, the direct current motor 2 is rotated by forcedly rotating the same in a direction opposite to its driving rotational direction, and is stopped by forcedly stopping the same.

When the direct current motor 2 is rotated in a direction opposite to its driving rotational direction by an external force, a counter electromotive force is generated by the direct current motor 2 and is added to a source voltage of the direct current source 4 to be supplied to the resistance type voltage dividing circuit 16. Then a voltage signal of the resistance type voltage dividing circuit 16 is increased to exceed a threshold value of the pulse generating means 12, and a pulse signal is generated by the pulse generating means 12. This pulse signal is stretched by the pulse stretcher 60 to be inputted to the driving means 14, and the direct current motor 2 is actuated by the driving means 14 in its driving rotational direction.

When the direct current motor 2 is rotated in an opposite direction, the leaf switch 6 is turned on and off, but an inhibit signal is outputted from the pulse generating means 12 to the synchronizing pulse generating means 62 for suppressing the output of the synchronizing pulse signal. Accordingly the output of the synchronizing pulse signal from the synchronizing pulse generating means 62 is suppressed, and the pulse generating means 12 is not triggered.

With the direct current motor 2 driven, since the leaf switch 6 is turned on and off by the rotation of the rotary shaft of the direct current motor 2, the synchronizing pulse signal is continuously outputted by the synchronizing pulse generating means 62. The pulse generating means 12 is triggered by the synchronizing pulse signal to continuously output the pulse signal. Since the pulse signal from the pulse generating means 12 is stretched by the pulse stretcher 60 until a next pulse signal, the direct current motor 2 is set on rotating by the driving means 14.

When the direct current motor 2 is stopped rotating by an external force, the leaf switch 6 does not turn on and off, the synchronizing pulse signal is not outputted any more from the synchronizing pulse generating means 62. Resultantly the pulse generating means 12 is not triggered, and the pulse signal is outputted any more, and the direct current motor 2 is stopped.

Next, an example of circuits of the direct current motor driving device according to this embodiment will be explained with reference to FIG. 4.

The pulse generating means 12 is a one-shot multivibrator comprising a NAND gate 30, a condenser 32, and a NAND gate 34.

The NAND gate 30 has a first input terminal connected to the intermediate node of the resistance type voltage dividing circuit 16, a second input terminal connected to the output terminal of the NAND gate 34, and an output terminal connected to the condenser 32. A threshold value of the NAND gate 34 is the threshold value of the pulse generating means 12. A first input terminal and a second input terminal of the NAND gate 34 is commonly connected to the condenser 32, the output terminal of the NAND gate 30 is connected to the second input terminal. The minus terminal of the direct current source 4 is connected through the resistor 40 to the intermediate node between the condenser 32 and the NAND gate 34.

The pulse stretcher 60 is a delay circuit comprising a resistor 64 and the condenser 66.

The resistor 64 is inserted as a buffer between the output terminal of the NAND gate 34 of the pulse generating means 12 and the first input terminal of the NAND gate 42.

The driving means 14 comprises the resistor 44, an npn transistor 46, an npn transistor 48, a condenser 50 and a resistor 52. The resistor 44 is inserted between the output terminal of the NAND gate 42 and the base of the npn transistor 46. The npn transistor 46 and the npn transistor 48 are Darlington-connected. The condenser 50 is inserted between the base of the npn transistor 46 and the collector thereof. The resistor 52 is inserted between the collector of the npn transistor 46 and the plus terminal of the direct current source 4.

The condenser 54 is inserted between the plus terminal of the direct current motor 2 and the minus terminal thereof for preventing the occurrence of noises.

The synchronizing pulse generating means 62 comprises a resistor 68, a NAND gate 70 and a condenser.

The resistor 68 is inserted between the leaf switch 6 and the plus terminal of the direct current source 4. The NAND gate 70 has a first input terminal connected to the leaf switch 6, a second input terminal connected to the output terminal of the NAND gate 30 of the pulse generating means 12, and the output terminal connected to the condenser 72. The condenser 72 is inserted between the output terminal of the NAND gate 70 and the first input terminal of the NAND gate 30 of the pulse generating means 12.

The operation of the example of circuits of the direct current motor driving device shown in FIG. 4 will be explained.

With the direct current motor 2 stopped, since a voltage of the minus terminal of the direct current motor 2 is substantially equal to a source voltage of the direct current source 4, a voltage signal slightly lower than a threshold value of the NAND gate 30 of the pulse generating means 12 is outputted, and consequently an output signal of the NAND gate 30 is of high level.

When the direct current motor 2 is rotated in a direction opposite to its driving rotational direction, a counter electromotive force generated by the direct current motor 2 is added to the source voltage of the direct current source 4 to be supplied to the resistance type voltage dividing circuit 16. Then, a voltage signal of the resistance type voltage dividing circuit 16 is increased to exceed the threshold value of the NAND gate 30 of the pulse generating means 12 and is of high level.

When the direct current motor 2 is rotated in an opposite direction, the leaf switch 6 is turned on and off, but an inhibit signal of low level is supplied from the NAND gate 30 of the pulse generating means 12 to the NAND gate 70 of the synchronizing pulse signal generating means 62. Consequently the output of the synchronizing pulse signal is suppressed, and the pulse generating means 12 is not triggered.

Subsequently when the opposite rotation of the direct current motor 2 is stopped, the voltage signal from the resistance type voltage dividing circuit 16 again has a slightly lower value than the threshold value of the NAND gate 30 of the pulse generating means 12, i.e., is of low level.

Consequently the one-shot multivibrator comprising the NAND gate 30, the condenser 32, and the NAND gate 34 is triggered by a fall of the input signal and generates the pulse signal. This pulse signal is stretched by the pulse stretcher 60 comprising the resistor 64 and the condenser 66 to be supplied to the NAND gate 42 as a buffer, and the driving means 14 actuates the direct current motor 2.

When the direct current motor 2 is actuated, the leaf switch 6 is turned off, while the inhibit signal from the output terminal of the NAND gate 30 becomes of high level. Then the synchronizing pulse generating means 62 outputs the synchronizing signal, and the pulse generating means 12 is triggered by this synchronizing signal to continue outputting the pulse signal. The pulse signal from the pulse generating means 12 is stretched by the pulse stretcher 60 until a next pulse signal, and the direct current motor 2 is set on rotating by the driving means 14.

When the direct current motor is stopped rotating by an external force, the leaf switch 6 does not turn on and off, and the synchronizing pulse signal is not outputted by the synchronizing pulse generating means 62. Resultantly the pulse generating means 12 is not triggered, and the pulse signal is not outputted. And the direct current motor 2 is stopped.

In this embodiment, as described above, the direct current motor 2 can be actuated by forcedly rotating the same in a direction opposite to its driving rotational direction, and can be stopped by forcedly stopping the same. Thus it is possible to actuate and stop the direct current motor with the use of a power switch.

Figure 5:
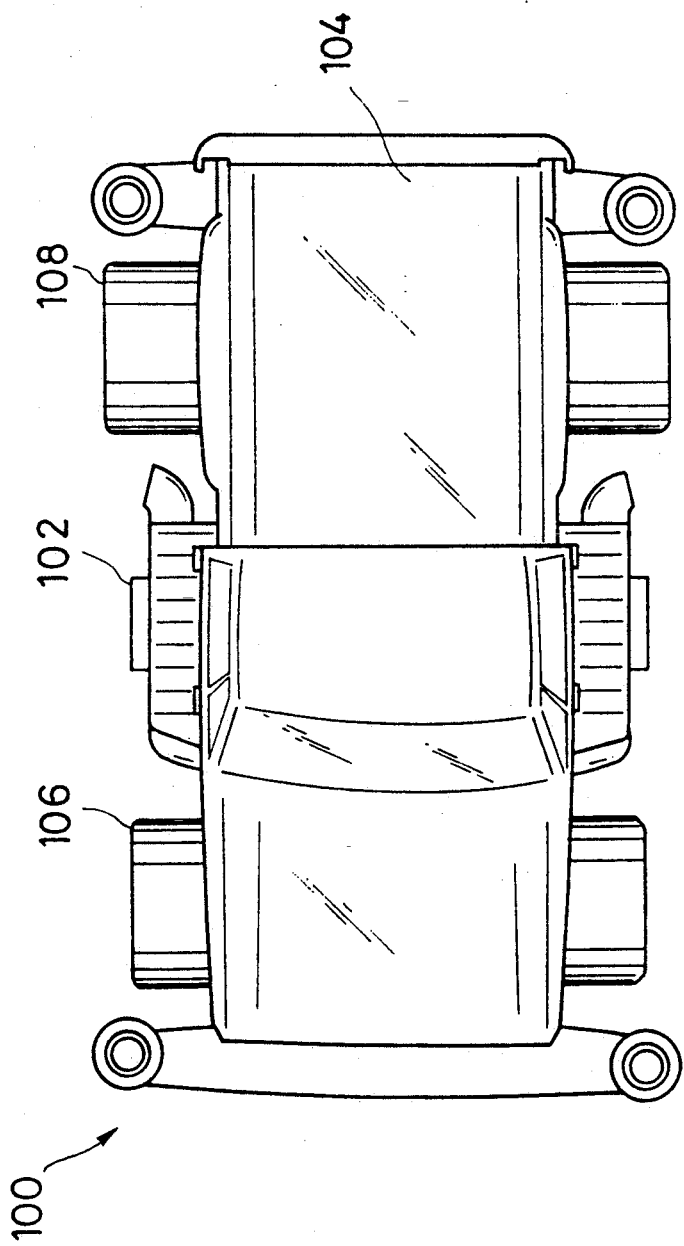
Figure 6:
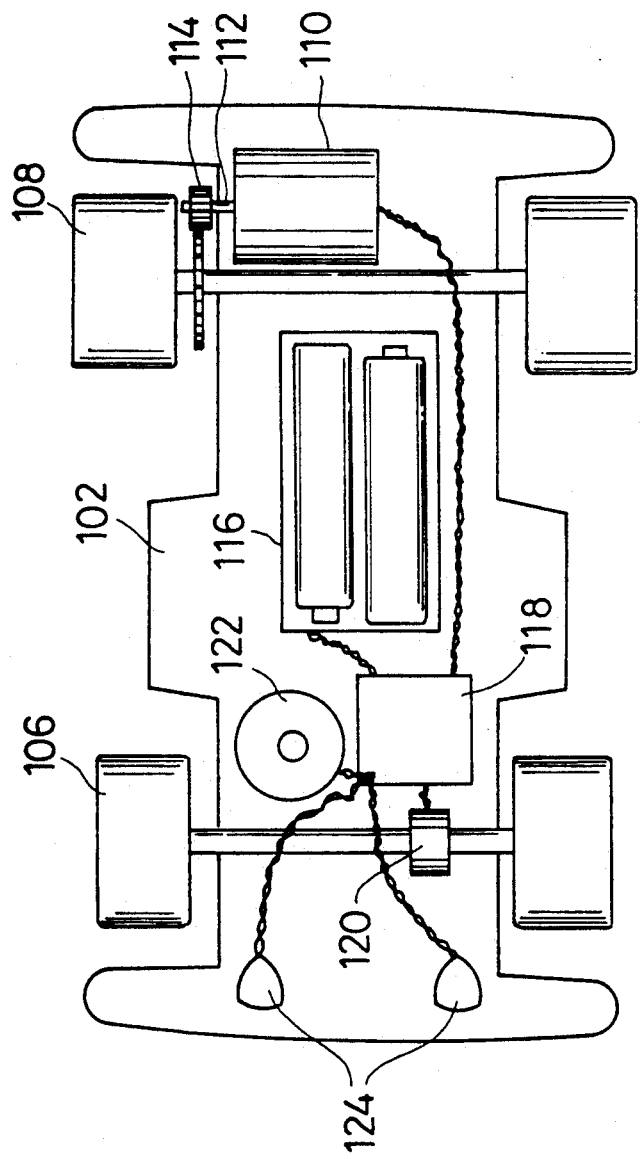
FIG. 6 is an appearance view of the toy car of FIG. 5 with the outer shell removed.

With reference to FIGS. 5 and 6 an example of applications of the direct current motor driving device according to the present invention in which the device is used in a toy car, one of mobile toys, will be explained. FIG. 5 is an appearance view of the toy car with the outer shell put on, and FIG. 6 is an appearance view of the toy car of FIG. 5 with the outer shell removed.

In this application example, major parts of the toy car 100 are mounted on a chassis 102, and all the parts are covered with an outer shell 104.

Front wheels 106 and rear wheels 108 are rotatably mounted on the chassis 102. A direct current motor 110 is mounted on the rear part of the chassis 102. The rotary shaft 112 of the direct current motor 110 is arranged to rotate the rear wheels 108 through a gear 114.

A direct current source 116 is mounted on the central part of the chassis 102, the direct current source 116 is two serially connected cells.

A motor driving device 118 according to the present invention is mounted on the chassis 102 between the direct current source 116 and the front wheels 106. This direct current motor driving device 118 incorporates the circuit of FIGS. 2 or 4.

In the case that the circuit of FIG. 4 is built in the direct current motor driving device 118, the leaf switch 120 is mounted on the axle of the front wheels 106. This leaf switch 120 is connected to the direct current motor driving device 118.

A speaker 122 and headlights 124 are mounted on the forward part of the chassis 102. The speaker 122 and the headlights 124 are connected to the output side of the direct current motor driving device 118 as is the direct current motor 110. Thus when the direct current motor 110 is actuated, the speaker 122 utters sounds and the headlights 124 turn on and off at the same time.

The basic operation of this toy car 100 will be explained.

To start driving the toy car 100, merely the toy car 100 is lightly pushed rearward with a hand, and then the hand is left. When the toy car 100 is pushed rearward, a counter electromotive force from the direct current motor 110 actuates the direct current motor 110, and the toy car 100 drives forward.

To stop driving the toy car 100, merely the toy car 100 is stopped with a hand. The rotation of the direct current motor 2 is stopped by forcedly stopping the same, and the driving of the toy car 100 is stopped.

By connecting the speaker 122 and the headlights 124 to the output side of the direct current motor driving device 118, while driving, engine sounds are uttered, the headlights 124 turning on and off.

The toy car 100 according to this application can be played in the following various ways in which the conventional toy cars have not been able to be played.

In a first way, when a player runs the toy car rearward, the toy car goes rearward by an inertia, then pauses, and then drives forward back into a player's hand.

In a second way, the toy car is left from a player's hand on a run slope to let down the toy car rearward. The toy car is caused to run down the slope by its own weight, and at the same time the toy car finishes running down and stops, the toy car drives forward up the slope and reaches the top. When the toy car stops at the top of the slope, the toy car again runs down the slope by its own weight. The toy car repeats the auto-running as does a permanent motion, ascending and descending the slope until the direct current source runs out. By making use of this motion, it is possible to make a run demonstration of the toy car in the absence of care-takers at toy shops.

The motor driving device according to the present invention is applied to toy cars, but the device is applicable to mobile toys other than toy cars. In addition, this device is widely applicable to other kinds of toys as the power sources, and to practical tools and instruments as the power sources.

What is claimed is:

1. A direct current motor driving device for driving a direct current motor having a plus terminal and a minus terminal, the device comprising:

a direct current source having a plus terminal and a minus terminal, the plus terminal being connected to the plus terminal of the direct current motor;

pulse generating means for generating a pulse signal when an input signal to an input terminal of the pulse generating means exceeds a set threshold value;

driving means for driving the direct current motor in response to the pulse signal outputted by the pulse generating means; and a first resistance type voltage dividing circuit inserted between the minus terminal of the direct current source and a minus terminal of the direct current motor for providing as the input signal to the pulse generating means a voltage signal produced by resistance-dividing a voltage between these terminals in a first ratio, whereby a counter electromotive force generated by the direct current motor by the rotation of the direct current motor by an external force in a direction opposite to its driving rotational direction is added to a source voltage of the direct current source to be supplied to the first resistance type voltage dividing means, the voltage signal of the first resistance type voltage dividing means is increased to exceed the set threshold value of the pulse generating means, and the pulse signal is generated by the pulse generating means to actuate the direct current motor.

2. A direct current motor driving device according to claim 1, further comprising:

pulse suppressing means for suppressing generation of the pulse signal by the pulse generating means when an input signal exceeds a set threshold value; and a second resistance type voltage dividing circuit inserted between the plus terminal of the direct current motor and the minus terminal of the direct current motor for providing as the input signal of the pulse suppressing means a voltage signal produced by resistance-dividing a voltage between these terminals in a second ratio, whereby a voltage to be supplied to the second resistance type voltage dividing circuit is decreased by stopping rotation of the direct current motor by an external force, the voltage signal of the second resistance type voltage dividing circuit is increased to exceed the set threshold value of the pulse suppressing means, generation of the pulse signal of the pulse generating means is suppressed, and the direct current motor is stopped.

3. A direct current motor driving device according to claim 2, wherein the pulse generating means comprises:

the first NAND gate including a first input terminal connected to the input terminal of the pulse generating means, a second input terminal, and an output terminal, a second NAND gate including a first input terminal, a second input terminal connected to the first input terminal of the first NAND gate, and an output terminal connected to the second input terminal of the first NAND gate, and a condenser inserted between the output terminal of the first NAND gate and the first input terminal of the second NAND gate, the pulse generating means being a one-shot multivibrator for outputting the pulse signal from the output terminal of the second NAND gate when the input signal to the pulse generating means exceeds the threshold value of the first NAND gate;

the first resistance type voltage dividing circuit comprises:

a first resistor inserted between the minus terminal of the direct current source and the input terminal of the pulse generating means, and a second resistor inserted between the input terminal of the pulse generating means and the minus terminal of the direct current motor;

the pulse suppressing means comprises:

a third NAND gate including a first input terminal connected to the input terminal, a second input terminal connected to the first input terminal, and an output terminal, and a third resistor connected to the output terminal of the third NAND gate, to the first input terminal of the second NAND gate of the pulse generating means, and to the node of the condenser; and the second resistance type voltage dividing circuit comprises:

a fourth resistor inserted between the plus terminal of the direct current source and an input terminal of the pulse suppressing means, and a fifth resistor inserted between the input terminal of the pulse generating means and the minus terminal of the direct current motor.

4. A direct current motor driving device according to claim 3, further comprising augmenting means inserted between the pulse generating means and the driving means for augmenting the pulse signal from the pulse generating means.

5. A direct current motor driving device according to claim 2, further comprising augmenting means inserted between the pulse generating means and the driving means for augmenting the pulse signal from the pulse generating means.

6. A direct current motor driving device according to claim 1, further comprising:

synchronizing pulse generating means for generating a synchronizing pulse signal synchronized with the rotation of the direct current motor and supplying the synchronizing pulse signal to the pulse generating means, the generation of the pulse signal by the pulse generating means is retained by the synchronizing pulse signal from the synchronizing pulse generating means while the direct current motor is rotating, and the generation of the synchronizing pulse signal by the synchronizing pulse generating means is suppressed to stop the direct current motor by stopping the rotation of the direct current motor by an external force.

7. A direct current motor driving device according to claim 6, wherein the pulse generating means comprises:

a first NAND gate including a first input terminal connected to the input terminal of the pulse generating means, a second input terminal, and an output terminal, a second NAND gate including a first input terminal, a second input terminal connected to the first input terminal of the first NAND gate, and an output terminal connected to the second input terminal of the first NAND gate, and a condenser inserted between the output terminal of the first NAND gate and the first input terminal of the second NAND gate, the pulse generating means being a one-shot multivibrator for outputting the pulse signal from the output terminal of the second NAND gate when the input signal to the pulse generating means exceeds the threshold value of the first NAND gate;

the first resistance type voltage dividing circuit comprises:

a first resistor inserted between the minus terminal of the direct current source and the input terminal of the pulse generating means, and a second resistor inserted between the input terminal of the pulse generating means and the minus terminal of the direct current motor; and the synchronizing pulse generating means comprises:

switching means inserted between the plus terminal of the direct current source and the minus terminal thereof and turning on and off by rotation of a rotary shaft of the direct current motor, a sixth resistor serially connected to the switching means, and a fourth NAND gate including a first input terminal connected to the switching means, a second input terminal and an output terminal.

8. A direct current motor driving device according to claim 7, further comprising augmenting means inserted between the pulse generating means and the driving means for augmenting the pulse signal from the pulse generating means.

9. A direct current motor driving device according to claim 6, further comprising augmenting means inserted between the pulse generating means and the driving means for augmenting the pulse signal from the pulse generating means.

10. A direct current motor driving device according to claim 1, wherein
the pulse generating means comprises:
a first NAND gate including a first input terminal connected to the input terminal of the pulse generating means, a second input terminal, and an output terminal,
a second NAND gate including a first input terminal, a second input terminal connected to the first input terminal of the first NAND gate, and an output terminal connected to the second input terminal of the first NAND gate, and
a condenser inserted between the output terminal of the first NAND gate and the first input terminal of the second NAND gate,
the pulse generating means being a one-shot multivibrator for outputting the pulse signal from the output terminal of the second NAND gate when the input signal to the pulse generating means exceeds the threshold value of the first NAND gate; and
the first resistance type voltage dividing circuit comprises:
a first resistor inserted between the minus terminal of the direct current source and the input terminal of the pulse generating means, and
a second resistor inserted between the input terminal of the pulse generating means and the minus terminal of the direct current motor.

11. A direct current motor driving device according to claim 10, further comprising augmenting means inserted between the pulse generating means and the driving means for augmenting the pulse signal from the pulse generating means.

12. A direct current motor driving device according to claim 1, further comprising augmenting means inserted between the pulse generating means and the driving means for augmenting the pulse signal from the pulse generating means.

13. A mobile toy comprising:
a mobile toy body;
running wheels for running the mobile toy body in a required direction;
a direct current motor having a plus terminal and a minus terminal for rotating the running wheels; and
a direct current motor driving device including a direct current source having a plus terminal and a minus terminal, the plus terminal being connected to the plus terminal of the direct current motor; pulse generating means for generating a pulse signal when an input signal to an input terminal thereof exceeds a set threshold value; driving means for driving the direct current motor in response to the pulse signal from the pulse generating means; and a first resistance type voltage dividing circuit inserted between the minus terminal of the direct current source and the minus terminal of the direct current motor for providing as the input signal to the pulse generating means a voltage signal produced by resistance-dividing a voltage between these terminals in a first ratio, whereby
a counter electromotive force generated by the direct current motor by running the mobile toy body in a direction opposite to its running direction by an external force is added to a source voltage to be supplied to the first resistance type voltage dividing circuit, the voltage signal of the first resistance type voltage dividing circuit is increased to exceed the set threshold value of the pulse generating means, and the pulse signal is generated by the pulse generating means to actuate the direct current motor and rotate the running wheels, and the mobile toy body runs in a running direction.

14. A mobile toy according to claim 13, wherein
the direct current motor driving device further comprises:
pulse suppressing means for suppressing the generation of the pulse signal of the pulse generating means when an input signal to an input terminal exceeds a threshold value; and
a second resistance type voltage dividing circuit inserted between the plus terminal of the direct current source and the minus terminal of the direct current motor for providing as the input signal a voltage signal produced by resistance dividing a voltage between these terminals in a second ratio, whereby
the voltage to be supplied to the second resistance type voltage dividing circuit is decreased by stopping the mobile toy body by an external force, the voltage signal of the second resistance type voltage dividing circuit is increased to exceed the threshold value of the pulse suppressing means, and generation of the pulse signal of the pulse generating means is suppressed to stop the direct current motor.

15. A mobile toy according to claim 14, wherein
the direct current motor further comprises:
synchronizing pulse generating means for generating a synchronizing pulse signal synchronized with rotation of the running wheels to supply the same to the pulse generating means,
the generation of the pulse signal from the pulse generating means being retained by the synchronizing pulse signal from the synchronizing pulse generating means to set the direct current motor on rotation while the running wheels are rotating, and
the synchronizing pulse signal from the synchronizing pulse generating means being suppressed by stopping the rotation of the running wheels by an external force, to stop the direct current motor.

* * * * *